United States Patent [19]

Maiorov

[11] Patent Number: 4,797,532

[45] Date of Patent: Jan. 10, 1989

[54] APPARATUS FOR LASER TREATMENT OF MATERIALS

[76] Inventor: Vladimir S. Maiorov, Dokuchaev pereulok, 15, kv. 42, Moscow, U.S.S.R.

[21] Appl. No.: 156,918
[22] PCT Filed: Mar. 26, 1986
[86] PCT No.: PCT/SU86/00025
 § 371 Date: Nov. 16, 1987
 § 102(e) Date: Nov. 16, 1987
[87] PCT Pub. No.: WO87/05843
 PCT Pub. Date: Oct. 8, 1987
[51] Int. Cl.⁴ ............................................. B23K 26/06
[52] U.S. Cl. ........................... 219/121.74; 219/121.78; 219/121.79; 219/121.63; 219/121.8
[58] Field of Search .... 219/121 L, 121 CM, 121 LU, 219/121 LV, 121 LW, 121 LC, 121 LD, 121 LG, 121 LN, 121 LQ; 350/486

[56] References Cited

U.S. PATENT DOCUMENTS 3,986,767 10/1976 Rexer et al. ............. 219/121 LQ X
4,367,017 1/1983 Jimbou et al. ........... 219/121 LV X
4,480,169 10/1984 Macken ..................... 219/121 LH
4,527,043 7/1985 Hashiura et al. ........ 219/121 LH X

FOREIGN PATENT DOCUMENTS 0110231 11/1983 European Pat. Off. .
0135851 9/1984 European Pat. Off. .
3332838 9/1983 Fed. Rep. of Germany .

Primary Examiner—C. L. Albritton
Attorney, Agent, or Firm—Lilling and Greenspan

[57] ABSTRACT

An apparatus for laser treatment of materials comprises a laser (1), a coordinate table (2) on which a material (3) to be treated is placed, a system (4) for delivery, transformation and focusing of laser radiation, equipped with an outlet barrel (6) and arranged along the path of a laser beam (7). The apparatus also has a numerical control system (8) connected to the laser (1) and the coordinate table (2). The laser radiation delivery, transformation and focusing system (8) comprises a mirror optical unit (9) equipped with a drive (10) for rotation about an axis (16) thereof and connected to the NC system (8).

The apparatus is universally applicable, easily adaptable to production conditions. It can be used for laser surface hardening, welding, doping cutting and various similar operations involving workpieces of intricate shapes.

5 Claims, 5 Drawing Sheets

APPARATUS FOR LASER TREATMENT OF MATERIALS

TECHNICAL FIELD

This invention relates to laser engineering and, in particular, to apparatuses for laser treatment of units and workpieces made from different materials and having various shapes.

This apparatus can be used for laser treatment of materials in various fields of machine building industry, such as machine-tool building, automotive industry, agricultural machine building industry, aircraft building, ship building, and the like, as well as for laser thermotreatment, laser doping, hardfacing, welding, cutting, and the like.

BACKGROUND ART

At present several laser treatment apparatuses are used to realize industrial applications of lasers for such production processes as thermal surface hardening, doping, welding, cutting, and other types of working of pieces varying in their size, shape, and material.

Known in the art is an apparatus for laser treatment of materials (FR, B, 2492703; or similar GB, A, 2088267), which can be used to cut metal sheets. This apparatus comprises a laser, a coordinate table on which the material to be treated is placed, a system for delivery, transformation, and focusing laser radiation, equipped with an output barrel, which is arranged along the laser beam. The apparatus is also provided with a numerical control (NC) system connected to the laser and coordinate table.

In this prior art apparatus for laser treatment of materials the laser beam is focused by a lens incorporated into the laser radiation delivery, transformation and focusing system and is directed, through a small-diameter nozzle of the output barrel, to the material to be treated. Simultaneously gas for cutting is supplied through the nozzle of the barrel coaxially with the laser beam. The sheet material is secured on the coordinate table which is controlled by the NC system. The sheet, together with the table, is transported along a desired path and cut by the laser beam.

Limitations of this laser treatment apparatus and similar devices are obvious-they can only be used for contour cutting of sheet materials.

The apparatus for laser treatment of materials (DE, C, 3217226) is equipped with a laser radiation delivery, transformation and focusing system comprising a shell connected to a rotation drive, the axis of rotation coincides with the axis of the laser beam. This system also comprises three mirrors arranged in the shell so that normals to the surfaces thereof lie in one plane with the axis of rotation of the shell, the normal to the surface of the second mirror is perpendicular to the shell axis of rotation, while normals to the surfaces of the first and third mirrors make acute angles with the normal to the surface of the second mirror. Fourth and fifth mirrors are arranged outside the shell and are connected with laser beam scanners in perpendicular planes.

When the drive operates, the shell rotates, and the laser beam coming out of the shell also rotates about its axis. This makes it possible to average irregularities of the laser mode structure and to obtain a sufficiently uniform axially symmetric laser beam. This laser beam is further on directed by the scanning devices of the fourth and fifth mirrors to produce, on the material being treated, a uniformly heated area whose shape is close to rectangular.

This apparatus for laser treatment of materials is deficient in that it contains too many optical components and its design is too complex. It cannot provide a wide range of laser-initiated heat sources of various shapes on the surface of the material being treated. Moreover, this apparatus features stationary scanning planes and the angular orientation of the heat source on the surface of the treated material cannot be changed. To summarize, the apparatus is not versatile and its applications are limited.

Also known in the art is a laser treatment device (FR, B, 2537029) comprising a laser, a coordinate table, a material for treatment, a laser radiation delivery, transformation and focusing system featuring an outlet barrel, which is arranged along the path of the laser beam and equipped with an NC system connected to the laser and the coordinate table, this coordinate table being an industrial robot adapted for rotation on a support. The laser radiation delivery, transportation and focusing system is a rotating work head comprising a laser beam focusing device and a hinged mirror beam guide for delivering laser radiation.

The apparatus operates as follows. The industrial robot positions the work head equipped with a hinged mirror beam guide in accordance with the program of the numerical control system. The material can be subjected to laser cutting or welding along an elaborate path.

But the apparatus described above is not universally applicable, the range of production operations and their types are limited because the apparatus uses only one work head and the structure of laser radiation hitting the material being treated cannot be either modified or changed altogether during the operational cycle.

DISCLOSURE OF THE INVENTION

This invention is to provide an apparatus for laser treatment of materials, capable, due to adding new degrees of freedom to the system for delivery, transformation and focusing of laser radiation, of broadening technical applications of the apparatus and the range of operations thereof.

This task is achieved by that in an apparatus for laser treatment of materials, comprising a laser, a coordinate table on which a material to be treated is placed, a system for delivery, transformation and focusing of laser radiation, equipped with an outlet barrel, arranged along the laser beam path, and provided with a numerical control system connected to the laser and the coordinate table, according to the invention, the laser radiation delivery, transportation and focusing system comprises a mirror optical unit provided with a drive to rotate said unit about its axis, which is connected to the NC system.

This permits realization of broader technological capabilities of the apparatus, better quality, stability and reliability of laser treatment of various materials and workpieces of different intricate shapes.

The mirror optical unit provided in the laser treatment apparatus disclosed herein should possibly be made as a mirror connected with an adjusting device.

The optical unit made on this manner is suitable for laser treatment of materials along elaborate contours and with constantly high quality.

It is advisable that in the laser treatment apparatus disclosed in this invention the mirror optical unit should be a mirror equipped with a scanning device.

This permits realization of high-quality uniform laser treatment whereby desired zones on the material being treated can be scanned.

It is useful, in some applications, that the axis of the mirror optical unit should be directed at an angle to the axis of rotation of said mirror optical unit.

This permits high-quality laser treatment of tiny ring-shaped zones on workpieces or realize circular scanning during laser treatment.

In the laser treatment apparatus disclosed in this description, the outlet barrel of the laser radiation delivery, transformation and focusing system may be equipped with a mirror arranged at an angle to the laser beam direction and connected with the drive of the mirror optical unit so that the barrel is capable of rotating about an axis coinciding with the laser beam axis.

This permits realization of treatment of lateral surfaces in holes with a permanently high quality, while maintaining an optimal laser treatment mode.

BRIEF DESCRIPTION OF THE ACCOMPANYING DRAWINGS

The invention will now be described in greater detail with reference to specific embodiments thereof and accompanying drawings wherein.

BEST MODE FOR CARRYING OUT THE INVENTION

Figure 1:
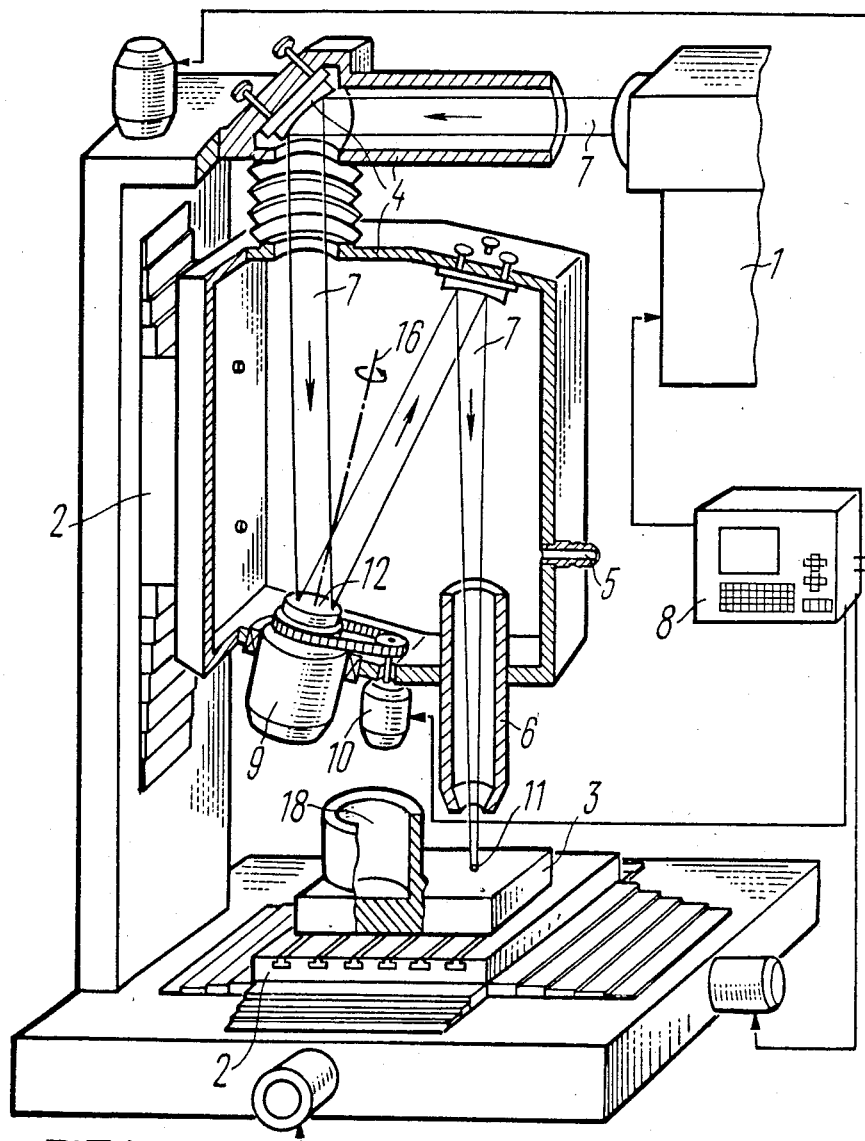
FIG. 1 shows schematically a general view of an apparatus for laser treatment of materials, according to the invention.

The apparatus for laser treatment of materials comprises a laser 1 (FIG. 1), a coordinate table 2 on which a material 3 to be treated is placed, a system 4 for delivery, transformation and focusing of laser radiation, equipped with an outlet barrel 6 and arranged along the path of a laser beam 7, a numerical control system 8 connected to the laser 1 and the coordinate table 2. The laser radiation delivery, transformation and focusing system 4 comprises a mirror optical unit 9 secured in a bearing and provided with a drive 10 connected to the NC system 8.

When the drive 10 is inoperative, the apparatus operates as a conventional laser treatment apparatus equipped with the system 4 for delivery, transformation and focusing of laser radiation having permanent shape. The focused laser beam 7 hits the material 3 and traces a path dictated by the motions of the coordinate table 2 controlled by the program of the NC system 8.

In a general case, the mirror, in the optical unit 9, may be non-isotropic. This mirror is also capable, in some way, to change its position with the aid of systems (not shown) which are parts of the mirror optical unit 9. This makes it possible to transform the structure of the laser beam 7 and change its direction. In this case, the desired orientation of a non-uniform and unsymmetrical heating spot located on the surface of the material 3 with respect to the path of the laser beam 7 on said material 3 can be achieved by the operation of the drive 10 in accordance with a program, built-in or calculated by specific algorithms in the NC system 8 concurrently with the movements of the coordinate table 2. This type of operation permits producing a non-uniform heat source 11 on the surface of the material 3, optimal for the laser treatment process. It also makes it possible to ensure desired position of this heat source 11 in all locations of the zone of treatment. In this manner, high quality, stability and reliability of laser treatment of various materials and workpieces having different shapes can be achieved. The apparatus becomes universally applicable with a wide range of production capabilities.

The mirror optical unit 9 (FIG. 2) may be made as a mirror 12 connected with an adjustment device 13. The mirror 12 may have different reflecting surfaces: flat, spherical, elliptical, cylindrical, mosaic, or equipped with a special diffraction grating. The mirror surface should be non-isotropic in order to obtain a desired structure of the laser beam 7 on the surface of the material 3 to be treated. The adjustment device 13 is to secured the mirror 12 in a desired position or change this position when necessary.

Figure 2:
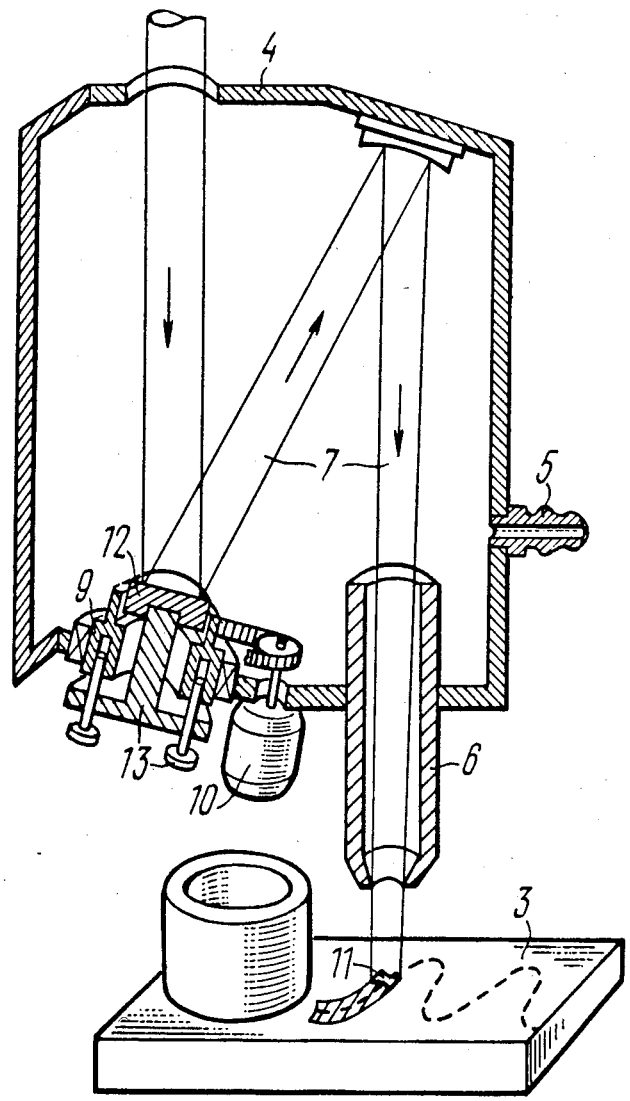
FIG. 2 shows a schematic of a part of an apparatus for laser treatment of materials, shown in FIG. 1, equipped with a mirror optical unit made as a mirror linked with an adjustment device, according to the invention.

When the apparatus of FIG. 1 is equipped with the mirror optical unit 9 of FIG. 2, the NC system 8 controls the drive 10 to achieve a desired orientation of the heat source 11 initiated by the laser beam 7 on the material 3. In this manner, high quality and uniformity of laser treatment can be attained however intricate the laser treatment path on the material 3.

Figure 3:
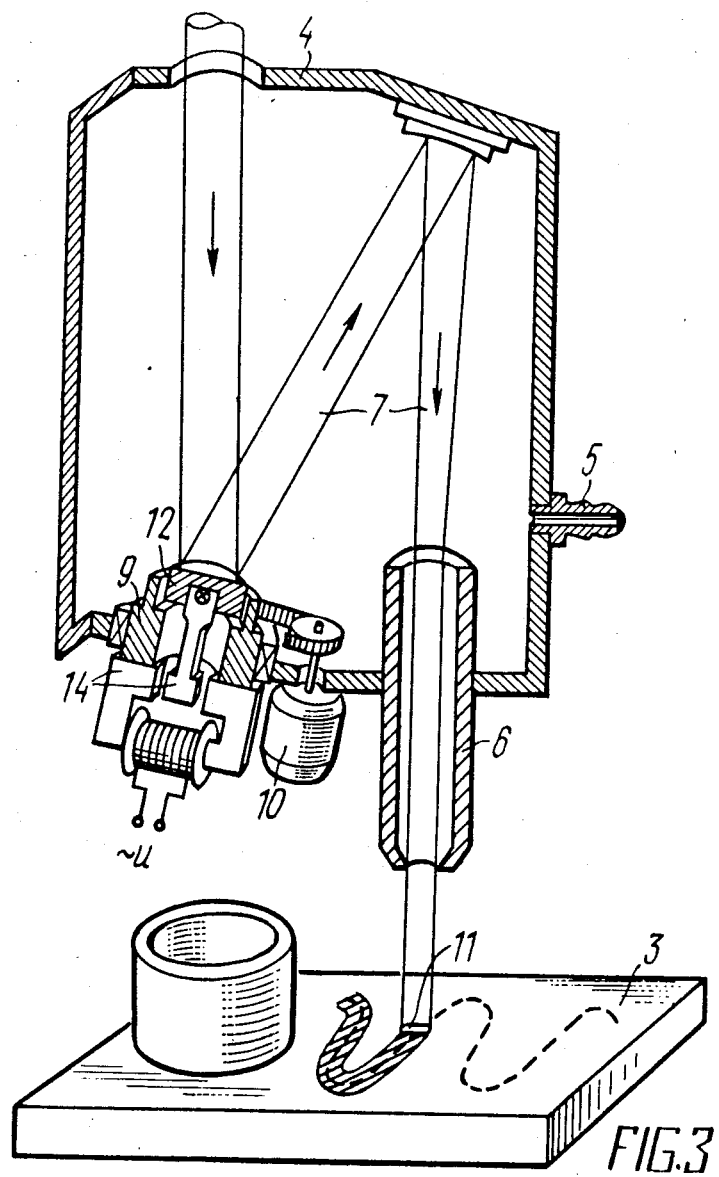
FIG. 3 shows a schematic of a part of an apparatus for laser treatment of materials, shown in FIG. 1 and FIG. 2, which is equipped with a mirror optical unit featuring a scanning device, according to the invention.

The mirror optical unit 9 (FIG. 3) may be made as a mirror 12 equipped with a scanning device 14.

The NC system 8 connects power to the scanning device 14 setting it in operation. Oscillations of the mirror 12 make the laser beam 7 oscillate at a frequency of hundreds of cycles in the zone of treatment on the surface of the material 3 to produce a uniform heat source 11 elongated in the scanning plane. The NC system 8 continuously calculates the direction of the movement vector and, if the treatment path on the material 3 is curvilinear as the coordinate table 2 is shifted, turns the mirror optical unit 9 by means of the drive 10 so that at any moment of time the angle between the scanning plane and the treatment path is kept constant. This is precisely the reason of uniform and high quality of laser working of materials, wherein scanning is used to treat any desired zones on this material.

Figure 4:
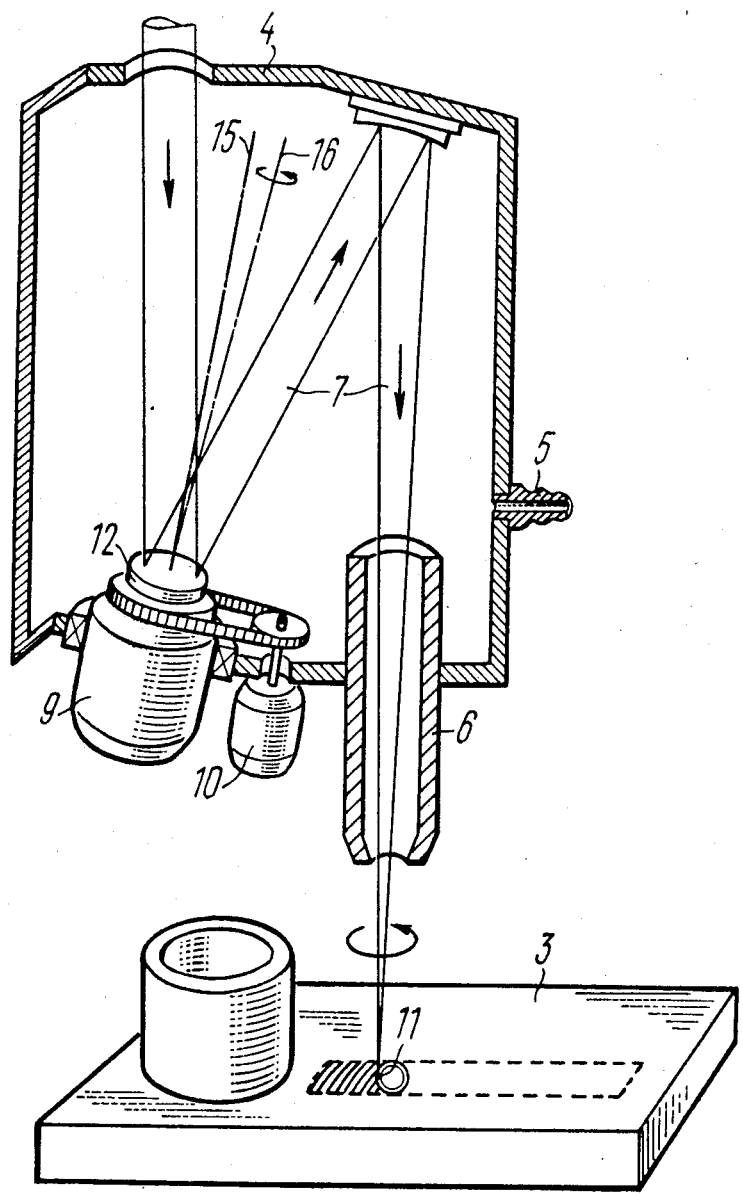
FIG. 4 illustrates some features of the apparatus for laser treatment of materials of FIG. 1, when the axis of the mirror of the mirror optical unit is displaced to an angle with respect to the axis of rotation of said mirror optical unit, according to the invention.

An axis 15 (FIG. 4) of the mirror 12 of the optical unit 9 may be arranged at an angle to the axis 16 of rotation of the optical unit 9.

When the mirror optical unit 9 is rotated by the drive 10, the laser beam 7 traces a circle on the surface of the material 3 being worked. This can be used, first to perform laser treatment of not-too-large circular patterns, which, sometimes, is mor convenient as compared to the method whereby circular motions of the coordinate table are employed, and, second, if the drive 10 ensures rotation of the mirror optical unit 9 at a speed of several tens of revolutions per minute, the laser beam 7 quickly tracing small circles on the surface of the material 3 can produce a uniform and axi-symmetrical heat source 11 thereon. This can be used in some types of laser working of materials, when such heat source 11 should trace a desired path on the material 3 in conformity with the program effected by the NC system 8.

Figure 5:
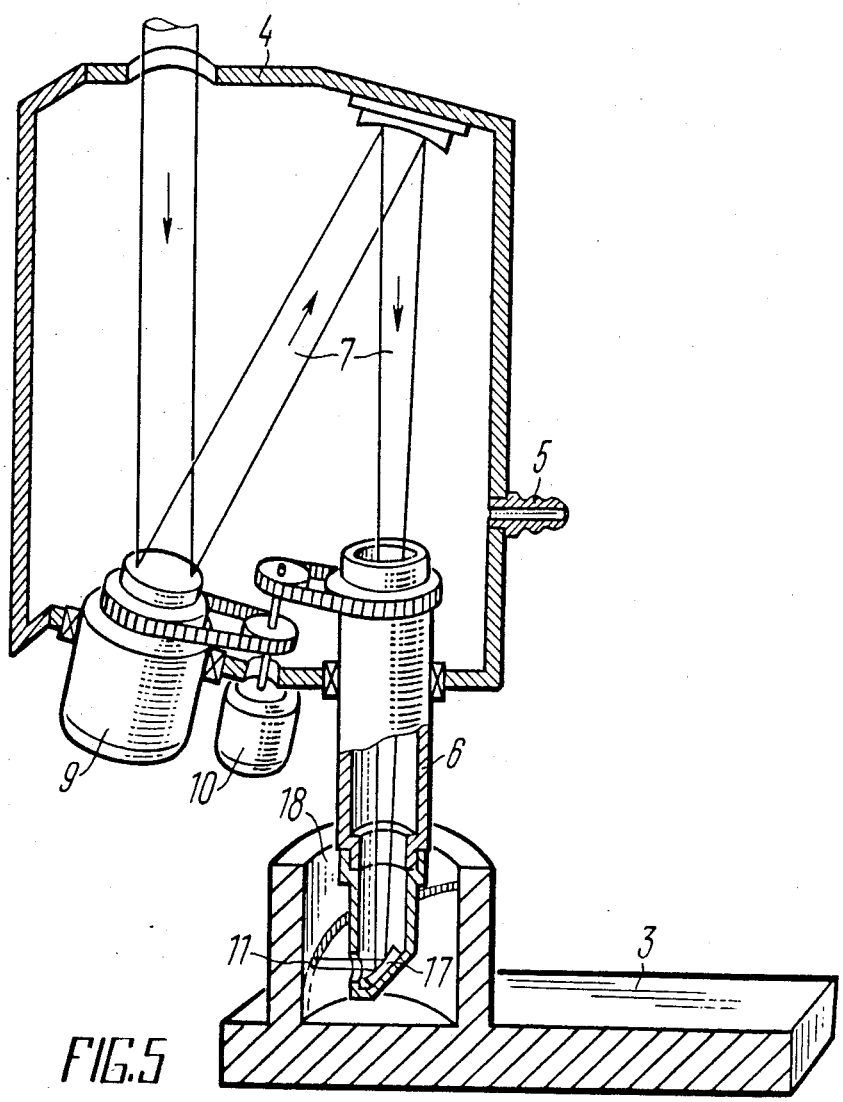
FIG. 5 shows a schematic of the apparatus for laser treatment of materials of FIG. 1, which is modified for treatment of holes, according to the invention.

The outlet barrel 6 (FIG. 5) of the laser radiation delivery, transformation and focusing system 4 can be adapted for rotation about an axis coinciding with the axis of the laser beam 7. This outlet barrel 6 is in this case equipped with a mirror 17 arranged at an angle to the direction of the laser beam 7 and connected to the drive 10 of the mirror optical unit 9.

The outlet barrel 6 with the mirror 17 is introduced into a hole 18 in the material 3 to be treated, and the laser beam 7 is directed towards the lateral wall of the hole 18. The NC system 8 controls the process so that a desired path of laser treatment is achieved due to the motions of the coordinate table 2, forward movement of the focusing head with the outlet barrel 6 of the system 4, and rotation of this outlet barrel 6. Since only one drive 10 is used, the mirror optical unit 9 turns in synchronism with the rotation of the outlet barrel 6. When the laser treatment path in the hole 18 is a regularly inclined spiral contour, permanent orientation of the heat source 11 can be achieved in relation to the treatment path. This is how optimal and stable laser treatment conditions are provided in order to obtain a high quality of laser treated zones. The apparatus becomes more universal, including such application as working of internal lateral surfaces in holes.

INDUSTRIAL APPLICABILITY

The laser treatment apparatus disclosed herein is used for laser surface hardening, welding, doping, cutting and several similar operations on workpieces made of various materials. In each particular case laser power is delivered to a desired location on the surface of the material being worked so that desired conditions of treatment are obtained. Zones of laser treatment can be located on external surfaces and inside holes. Their shape is practically without limitations. This means that the apparatus for laser treatment proposed herein can be used instead of several specialized machines, can help improve the quality of products, broaden their range, reduce costs, and achieve higher efficiency of the treatment process.

The apparatus for laser treatment of different materials disclosed herein has an extremely wide range of applications. It is practically a new type of NC manufacturing centers-a laser treatment center which can be used as a component of flexible manufacturing systems.

I claim:

1. An apparatus for laser treatment of materials, comprising a laser (1), a coordinate table (2) on which a material (3) to be treated is placed, a system (4) for delivery, transformation and focusing of laser radiation, equipped with an outlet barrel (6), arranged along the path of a laser beam (7), and provided with a numerical control system (8) connected to the laser (1) and the coordinate table (2), characterized in that the laser radiation delivery, transformation and focusing system (4) comprises a mirror optical unit (9) provided with a drive (10) for rotation about the axis (16) thereof and connected to the numerical control system (8).

2. An apparatus as claimed in claim 1, characterized in that the mirror optical unit (9) is made as a mirror (12) connected with an adjusting device (13).

3. An apparatus as claimed in claims 1 and 2, characterized in that the mirror optical unit (9) is made as a mirror (12) equipped with a scanning device (14).

4. An apparatus as claimed in claim 1, characterized in that an axis (15) of the mirror (12) of the mirror optical unit (9) is directed at an angle to the axis (16) of rotation of the optical unit (9).

5. An apparatus as claimed in claim 1, characterized in that the outlet barrel (6) of the system (4) for delivery, transformation and focusing of laser radiation is provided with a mirror (17) set at an angle to the direction of the laser beam (7) and connected with the drive (10) of the mirror optical unit (9) so that the outlet barrel (6) can rotate about an axis coinciding with the axis of the laser beam (7).

* * * * *